April 14, 1959 P. A. DREHER 2,882,021
COLLAPSIBLE BARRICADE
Filed Oct. 18, 1957

INVENTOR.
PAUL A. DREHER
BY
Patrick D. Beaver
ATTORNEY

United States Patent Office 2,882,021
Patented Apr. 14, 1959

2,882,021
COLLAPSIBLE BARRICADE
Paul A. Dreher, West Palm Beach, Fla.
Application October 18, 1957, Serial No. 690,931
2 Claims. (Cl. 256—64)

This invention relates to improvements in barricades such as are used by construction personnel and various contractors, where an area is to be blocked off, such as a portion of a road.

An important object of the invention is to provide a collapsible barricade which can be conveniently collapsed and stored in a small space in a truck or a warehouse.

Another important object of the invention is to provide a barricade constructed in such a manner as to permit its use on uneven ground, thus affording a substantial support against wind and accidental displacement.

Still another object of the invention is to provide a barricade, which will be capable of manufacture at a low cost and correspondingly furnished the trade at a low monetary figure.

Still a further object of the invention is to provide a barricade of the character and merits stated which is not only of simple construction, but durable and not capable of the ready development of defects.

These and various other objects and advantages of the invention will become apparent to the reader of the following description.

Figures 1, 2:
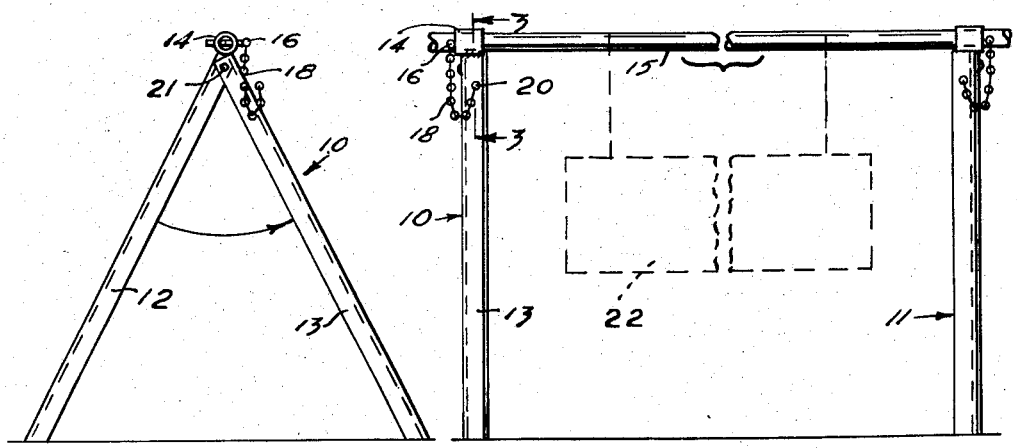
Figure 1 is a side elevational view of the improved barricade.
Figure 2 is an end elevational view.
Figure 3:
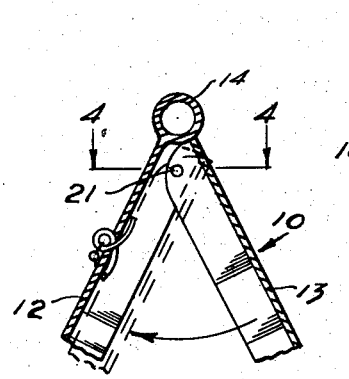
Figure 3 is an enlarged vertical section taken on line 3—3 of Figure 1.
Figure 4:
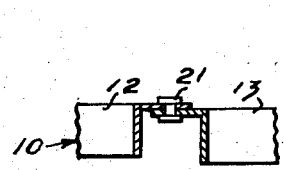
Figure 4 is an enlarged fragmentary sectional view taken on line 4—4 of Figure 3.

Referring to the drawings wherein like numerals designate like parts, it can be seen that this improved barricade includes a pair of leg assemblies generally referred to by numerals 10, 11.

Each leg assembly consists of a pair of angle bars 12, 13, the upper end of the bar 12 being welded or otherwise secured to a collar 14 for receiving the corresponding end of an elongated barricade pipe or element 15. The end portions of this barricade element may extend substantially beyond the collars 14, but have openings therein for receiving pins 16, which prevent shifting of the barricade element through the collars 14. Thus when the structure is set up as shown in Figure 1, the barricade element 15 is prevented from any longitudinal shifting and perhaps displacement from the leg assemblies 10, 11.

One end of each pin 16 has an eye 17 and from this extends a chain or flexible element 18, connecting to a spring retainer 19. This spring retainer 19 is simply a piece of spring wire, looped at its mid-point to receive the end link of the chain 18 and the leg portions of this retainer 19 can be flexed and inserted through an opening 20 in the corresponding bar 13, thus anchoring the chain and corresponding pin 16 in position.

It will be observed that the upper portion of the bar 13 of each assembly is pivotally connected as at 21 to the upper portion of the corresponding or complemental bar 12. Various signs or other indications can be hung from the barricade element 15, such as is indicated in dotted lines and denoted by numeral 22 (see Figure 1).

Figure 6:
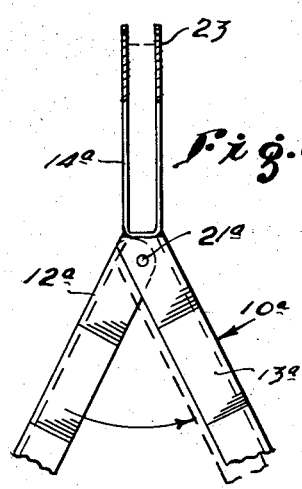
Figure 6 is a fragmentary elevational and sectional view showing one end of a slightly modified form of the invention.
Figure 7:
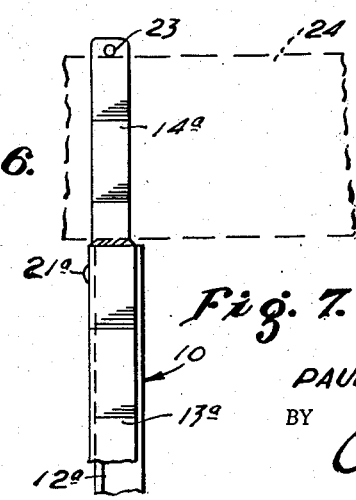
Figure 7 is a fragmentary side elevational view of the modified form showing in Figure 6.

Figures 6 and 7 indicate a similar construction wherein a bar 12a of a leg assembly 10a has an upstanding U-shaped bracket 14a welded or otherwise secured thereto. In this form of the invention a corresponding bar 13a is similarly pivoted as at 21a to the upper portion of the bar 12a.

Figure 5:
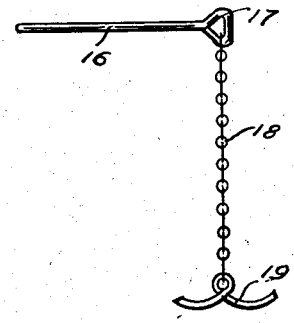
Figure 5 is a side elevational view of the detent pin and securing means.

The upper portions of the U-shaped bracket 14a have openings 23 therein for receiving a pin, which can be secured to the structure similarly to the pin shown in Figure 5.

It can be seen that the usual board barricade shown in Figure 7 by broken line and denoted by numeral 24 can be positioned in the U-shaped brackets 14a. Thus conventional barricade boards may be employed in place of the pipe type barricade element 15 as shown in Figure 1.

The use and assembling of this structure is undoubtedly apparent from the foregoing. It might be explained however, that the structure, as for instance shown in Figures 1 and 2 is taken out of a truck or storage house, with the leg assemblies 10, 11 collapsed and the barricade element 15 removed from the collars 14, or the barricade board 24, as in the instance of the modification shown in Figures 6, 7.

All that is necessary is to spread the legs apart on each assembly 10, 11, insert the barricade element 15 or the barricade board 24, in the particular instance of each form and then insert the corresponding pins 16, through the pipe or barricade element 15, with respect to the form shown in Figure 1 or through the upper portion of the U-shaped brackets 14a, in the instance of the form shown in Figures 6 and 7.

Due to the fact that the legs or bars 12, 13 are not fixed, they will assume steady positions on uneven ground, thus supporting the entire barricade structure firmly, warding off accidental knock-downs and resistance against wind.

While the foregoing decription sets forth the invention in specific terms, it is to be understood that numerous changes in the shape, size and materials may be resorted to without departing from the spirit and scope of the invention as claimed hereinafter.

Having described the invention what is claimed as new is:

1. A barricade comprising a pair of leg assemblies, each leg assembly consisting of a pair of channeled members, one channeled member being provided with a tubular collar at its upper end, the other leg of the same assembly being pivotally connected to the flanges of the first mentioned channeled leg, adjacent the tubular collar and provided with a protruding portion adapted to bind against the tubular collar when the legs are in spread position, and an elongated member having its end portions disposed through said tubular collars.

2. A barricade comprising a pair of leg assemblies, each leg assembly consisting of a pair of channeled members, one channeled member being provided with a tubular collar at its upper end, the other leg of the same assembly being pivotally connected to the flanges of the first mentioned channeled leg, adjacent the tubular collar and provided with a protruding portion adapted to bind against the tubular collar when the legs are in spread position, and an elongated member having its end portions disposed through said tubular collars, and detent means for holding the elongated member in position against shifting through said tubular collars.

References Cited in the file of this patent
UNITED STATES PATENTS

| | | |
|---|---|---|
| 739,886 | Loge et al. | Sept. 29, 1903 |
| 2,755,144 | Simmons | July 17, 1956 |